United States Patent
Lee

(10) Patent No.: US 6,719,085 B2
(45) Date of Patent: Apr. 13, 2004

(54) RETRACTABLE ORNAMENT ASSEMBLY FOR AN EXHAUST PIPE OF A VEHICLE

(75) Inventor: Mong-Yu Lee, No. 182, Chienfeng Rd., Kangshan Chen, Kaohsiung Hsien (TW)

(73) Assignee: Mong-Yu Lee, Kaohsiung (TW)

( * ) Notice: Subject to any disclaimer, the term of this patent is extended or adjusted under 35 U.S.C. 154(b) by 0 days.

(21) Appl. No.: 10/157,316

(22) Filed: May 29, 2002

(65) Prior Publication Data

US 2002/0179360 A1 Dec. 5, 2002

(30) Foreign Application Priority Data

May 31, 2001 (TW) .................................. 90208959 U

(51) Int. Cl.[7] .............................................. A63H 29/10
(52) U.S. Cl. ....................... 180/309; 446/57; 446/217; D12/194
(58) Field of Search ........................... 180/309; 60/685; 440/49, 47, 82; 446/57, 36, 37, 482, 217; 280/504; D12/194, 214

(56) References Cited

U.S. PATENT DOCUMENTS

| | | | | |
|---|---|---|---|---|
| 688,762 A | * | 12/1901 | Weber ........................ 446/39 |
| 896,606 A | * | 8/1908 | Wright ........................ 116/138 |
| 1,019,571 A | * | 3/1912 | West ........................... 116/138 |
| 1,873,896 A | * | 8/1932 | Krastin ........................ 446/39 |
| 3,570,467 A | * | 3/1971 | Belokin, Jr. ................. 124/26 |
| 3,807,087 A | * | 4/1974 | Staats et al. ................. 446/58 |
| 4,897,068 A | | 1/1990 | Jackson |
| 6,086,438 A | * | 7/2000 | Wang ........................... 440/49 |
| D452,205 S | * | 12/2001 | Eisenbraun ................ D12/162 |

* cited by examiner

*Primary Examiner*—Avraham Lerner

(57) ABSTRACT

An ornament assembly for an exhaust pipe of a vehicle has a sleeve, an axle, a spring and a propeller. The sleeve is secured in an opening end of the exhaust pipe. The axle is moveably received in the sleeve. The axle has a first end exposed from the sleeve and a second and extending into the sleeve. The spring is received in the sleeve and is securely attached between the sleeve and the second end of axle. The propeller is rotatably mounted on the first end of the axle. Accordingly, the propeller will rotate when the waste gases are emitted from the exhaust pipe, and the axle will move relative to the sleeve. This can provide an excellent visual effect to the vehicle, and the appearance of the vehicle is improved.

12 Claims, 4 Drawing Sheets

US 6,719,085 B2

RETRACTABLE ORNAMENT ASSEMBLY FOR AN EXHAUST PIPE OF A VEHICLE

BACKGROUND OF THE INVENTION

1. Field of the Invention

The present invention relates to an ornament assembly, and more particularly to a retractable ornament assembly for an exhaust pipe of a vehicle.

2. Description of Related Art

To improve the appearance of a vehicle, ornaments are often mounted on the vehicle, such as hubcaps. In practice, there is an ornament assembly attached to the exhaust pipe vehicle to enhance the appearance of the whole vehicle. The conventional ornament assembly for the exhaust pipe comprises a propeller rotatably attached to the exhaust pipe. Consequently, the exhaust gases from the exhaust pipe will actuate the propeller to rotate, such that an attractive visual is provided.

However, the propeller of the conventional ornament assembly is located inside the exhaust pipe and is not moveably relative to the exhaust pipe. The visual effect of the conventional ornament assembly is not mobile, and so the ornamental effect provided by the conventional assembly is not enough. In addition, the propeller is easily deformed due to the high temperature of the exhaust gases, whereby the rotation speed of the propeller will be irregular and slow. The propeller with a low speed will influence the dispersal of the exhaust gases such that the gases may back up to the engine, causing inefficiency in the running of the engine.

To overcome the shortcomings, the present invention tends to provide an ornament assembly to mitigate or obviate the aforementioned problems.

SUMMARY OF THE INVENTION

The main objective of the invention is to provide an ornament assembly for an exhaust pipe of a vehicle and that can provide an excellent mobile visual effect. The ornament assembly has a sleeve, an axle, a spring and a propeller. The sleeve is secured in an opening end of the exhaust pipe. The axle is moveably received in the sleeve. The axle has a first end exposed from the sleeve and a second end extending into the sleeve. The spring is received in the sleeve and is securely attached between the sleeve and the second end of the axle. The propeller is rotatably mounted on the first end of the axle. In such an arrangement, the propeller will rotate when the exhaust gases are emitted from the exhaust pipe, and the axle will move relative to the sleeve. The axle with the propeller will move outward and inward from the sleeve during movement of the vehicle, and the appearance of the vehicle is improved.

Other objects, advantages and novel features of the invention will become more apparent from the following detailed description when taken in conjunction with the accompanying drawings.

DETAILED DESCRIPTION OF PREFERRED EMBODIMENT

Figure 1:
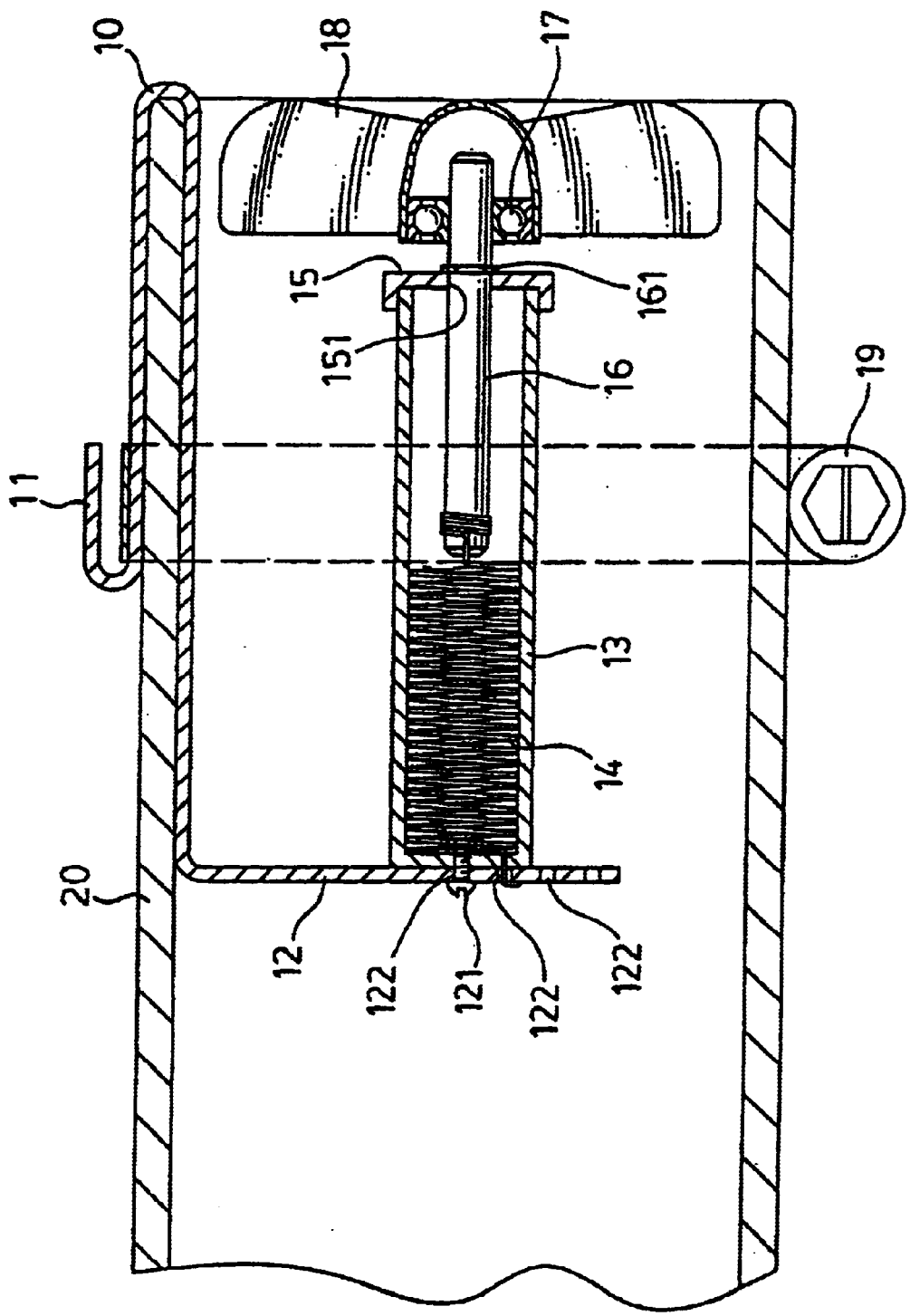
FIG. 1 is a side plan view in partial cross section of an exhaust pipe with an ornament assembly in accordance with the present invention.

With reference to FIG. 1, an ornament assembly for an exhaust pipe of a vehicle in accordance with the present invention comprises a sleeve (13), an axle (16), a spring (14) and a propeller (18). The sleeve (13) is secured in an opening end of the exhaust pipe (20). The sleeve (13) has a closed end and an opening defined in the other end of the sleeve (13). A cap (15) is attached to the sleeve (13) to close the opening in the sleeve (13), and a central hole (151) is defined in the cap (15).

In practice, the sleeve (13) is securely attached to the exhaust pipe (20) through a stand (10). The stand (10) is securely attached to the exhaust pipe (20) with a fastener (19). The stand (10) has a body and a tab (12) for the sleeve (13) being securely attached to the tab (12). The body of the stand (12) has a U-shaped cross section and is mounted around a part of the periphery of the exhaust pipe (20). The body has a first end exposed from the exhaust pipe (20) and a second end extending into the exhaust pipe (20). The fastener (19) is a C-shaped ring and is mounted around the body of the stand (12). A bolt (not numbered) extends through the fastener (19) to close the opening of the fastener (19), such that the body of the stand (10) can be securely attached to the exhaust pipe (20) by the fastener (19) with the bolt. A flange (11) is formed on the first end of the body to hold the fastener (19) in place.

In another embodiment, the sleeve (13) can be attached to a tail pipe which is attached to the exhaust pipe to enhance the appearance of the vehicle.

The tab (12) extends downward from the second end of the body of the stand (10) and extends toward a center line of the exhaust pipe (20). The tab (12) has multiple bores (122) defined in the tab (12). A bolt (121) extends through one of the bores (122) in the tab (12) and the closed end of the sleeve (13) and is screwed with a nut, such that the sleeve (13) is secured to the tab (12) with the bolt (121) and the nut. In addition, to penetrate the bolt (121) through different bores (122) in the tab (12), the location of the sleeve (13) relative to the tab (12) is changed. Consequently, the location of the sleeve (13) is adjustable according to different sizes, types of exhaust pipe of vehicle.

The axle (16) is moveably received in the sleeve (13) and has a first end exposed from the sleeve (13) through the central hole (151) in the cap (15) and a second end extending into the sleeve (13). The spring (14) is received in the sleeve (13) and is securely attached between the sleeve (13) and the second end of the axle (16). One end of the spring (14) extends outward from the closed end of the sleeve (13) and is hooked on one of the bores (122) in the tab (12). The other end of the spring (14) is securely attached to second end of the axle (16). Consequently, the spring (14) can provide a recoil force to the axle (16). In another embodiment, two ends of the spring (14) are respectively securely attached to the cap (15) and the second end of the axle (16), and this also can provide a recoil force to the axle (16) to urge the axle (16) to an original position. A stop (161) is attached to the axle (16) to abut the cap (15) so as to limit a travel of the axle (16) relative to the sleeve (13).

The propeller (18) is rotatably mounted on the axle (16) at a position exposed from the sleeve (13). In practice, the propeller (18) is rotatably mounted on the first end of the axle (16). In another embodiment, the axle (16) penetrates through the propeller (18). A bearing (17) is mounted between the axle (10) and the propeller (18) to make the propeller (18) freely rotate relative to the axle (16).

Figure 2:
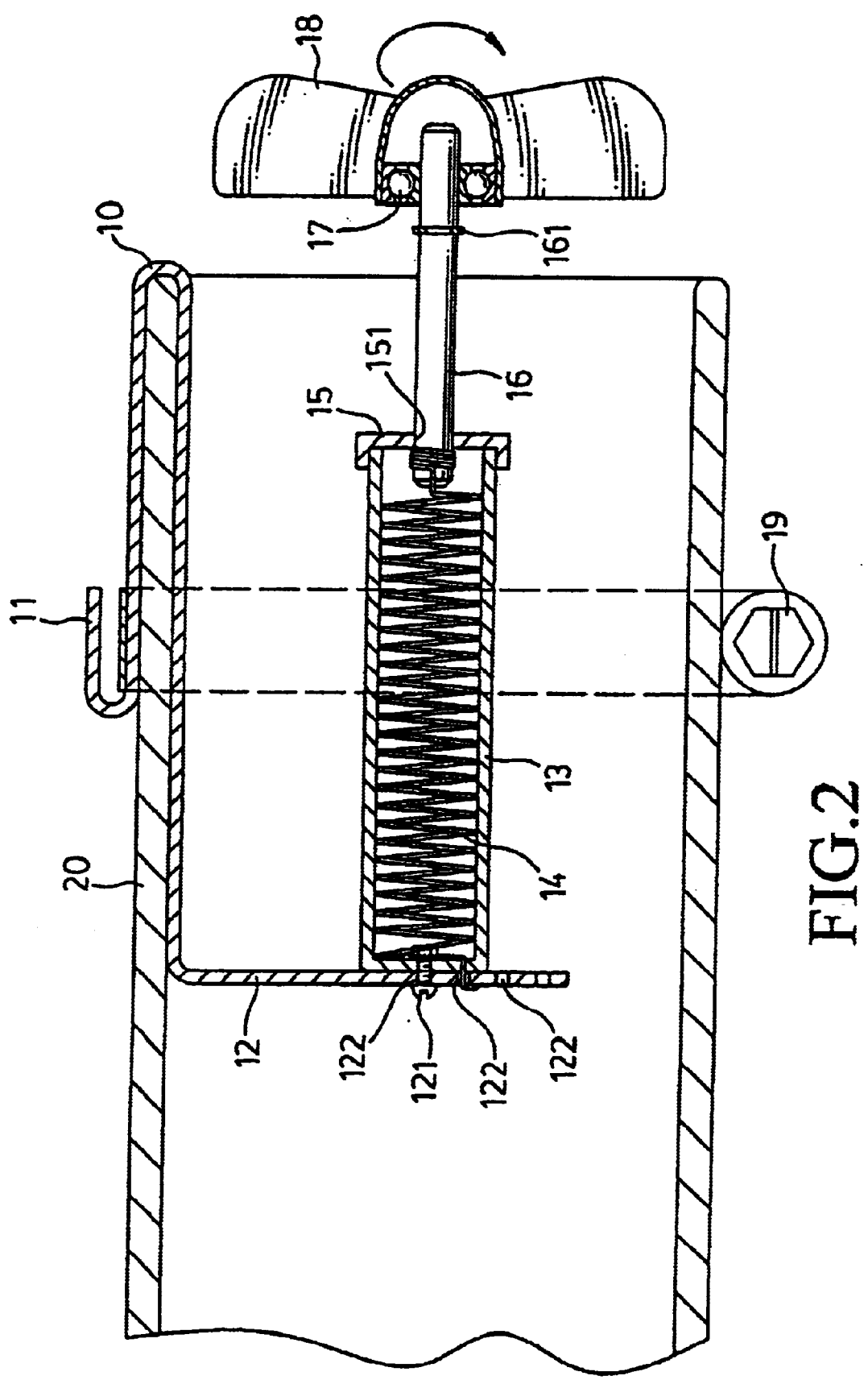
FIG. 2 is an operational side plan view in partial cross section of the exhaust pipe with the ornament assembly in FIG. 1.

With reference to FIGS. 1 and 2, when the engine of the vehicle is switched on and the exhaust gases are emitted from the exhaust pipe (20), the propeller (18) will be actuated to rotate by the gases. In the meantime, the axle (16) will move outward relative to the sleeve (13). When the amount of the exhaust gases increases, the rotation speed of the propeller (18) and the movement of the axle (16) outward from the sleeve (13) will also increase. When the amount of the exhaust gases decreases, the rotation speed of the propeller (18) will reduce and the axle (16) will move inward relative to the sleeve (13) due to the recoil force provided by the spring (14). Not only the waste gases can be rapidly exhausted with the rotation speed or the propeller (18), but also the ornament assembly can provide an excellent visual effect to the vehicle with the movements of the axle (16) and the propeller (19). Accordingly, the appearance of the vehicle is largely increased. In addition, because the propeller (18) will be exposed from the exhaust pipe (20) when the waste gases are exhausted, the high temperature will not influence the structure and the material of the propeller (18). This can keep the propeller (18) in an excellent rotatable condition even after a long time of use.

Figure 3:
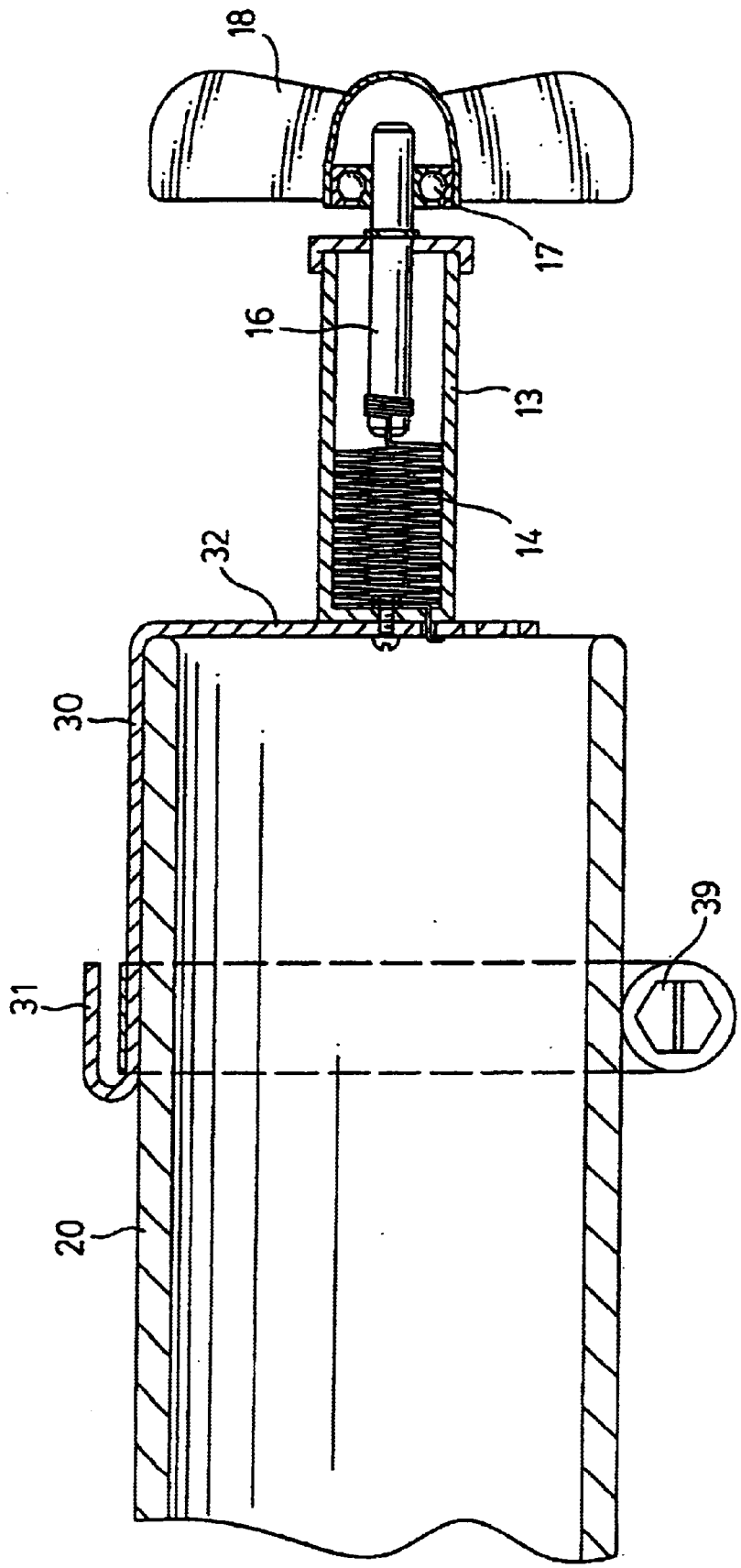
FIG. 3 is a side plan view in partial cross section of an exhaust pipe with another embodiment of an ornament assembly in accordance with the present invention.

With reference to FIG. 3, in another embodiment, the stand (30) has a body attached to an outer periphery of the exhaust pipe (20). The body has a first end extending to the opening of the exhaust pipe (20) and a second end far away from the opening of the exhaust pipe (20). The tab (32) extends downward from the first end of the body of the stand (30) and extends toward a center line of the exhaust pipe (20). A flange (31) is formed on the second end of the body to hold the fastener (39) in place. Accordingly, the sleeve (13) with the propeller (18) can be exposed from the exhaust pipe (20), and the propeller (18) will not be influenced by the high temperature of the exhaust gases. This can keep the propeller in an excellent rotatable condition, and the useful life of the ornament assembly is prolonged.

Figure 4:
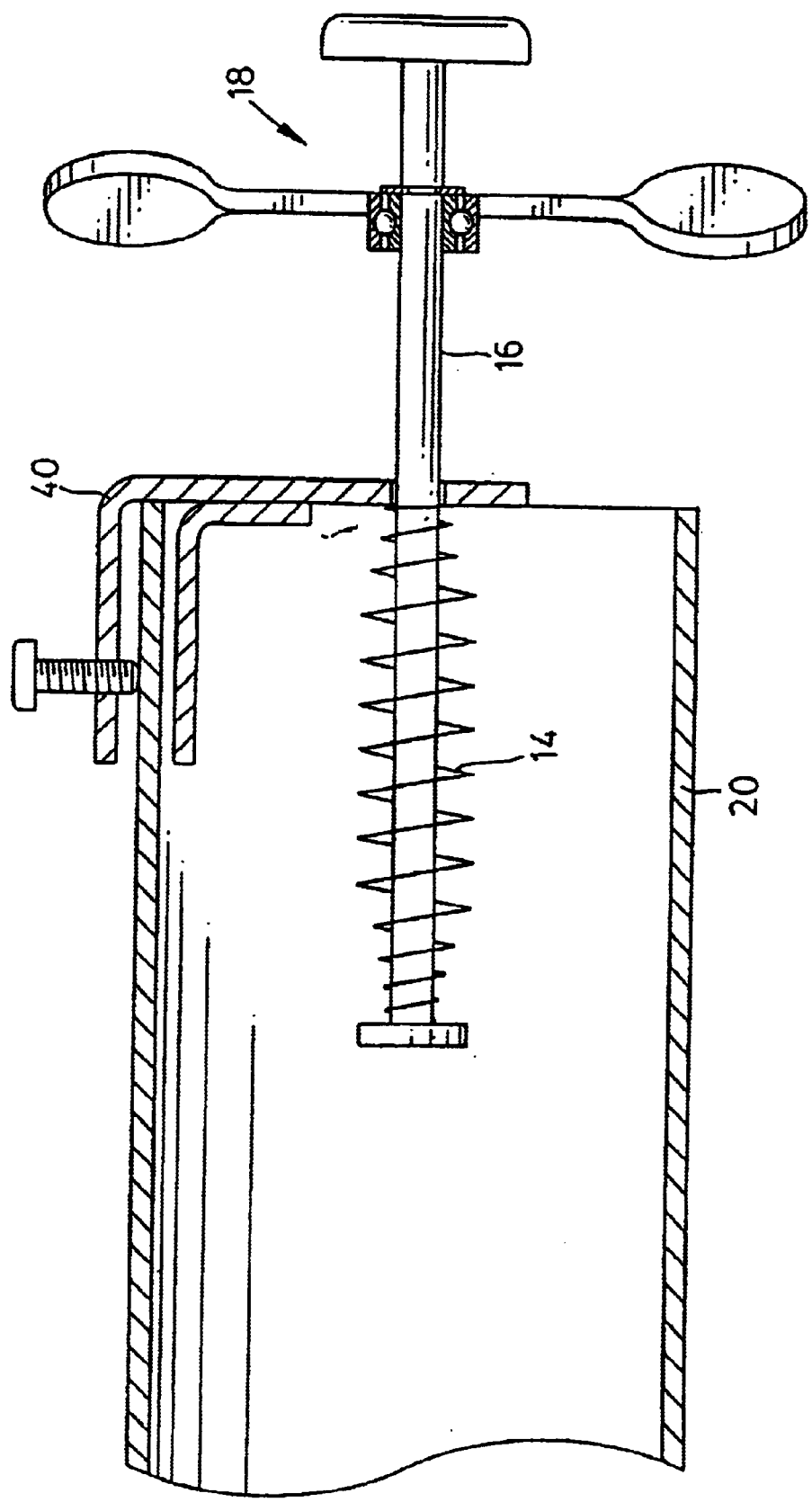
FIG. 4 is a side plan view in partial cross section of an exhaust pipe with a further embodiment of an ornament assembly in accordance with the present invention.

With reference to FIG. 4, the stand (40) is secured to the exhausting pipe (20) with bolts (not numbered) or with a welding process. A through hole (not numbered) is defined in the stand (40) for the axle (16) extending through the through hole in the stand (40), such that the axle (16) is moveably mounted on the stand (40). The axle (16) has a first end extending into the exhausting pipe (20) and a second end extending out from the exhausting pipe (20). The spring (14) is mounted around the axle (16) and has two ends respectively abutting the first end of the axle (16) and the stand (40), such that the spring (14) can provide a recoil force to the axle (16). The second end of the axle (16) penetrates through the propeller (18), and the propeller (18) is mounted on the axle (16) at a position far from the first and of the axle (16).

In such an embodiment, the propeller (18) will be actuated to rotate by the exhausted gases from the exhaust pipe (20), and the axle (16) will move relative to the stand (40). Accordingly, a mobile and retractable visual effect is provided.

Even though numerous characteristics and advantages of the present invention have been set forth in the foregoing description, together with details of the structure and function of the invention, the disclosure is illustrative only, and changes maybe made in detail, especially in matters of shape, size, and arrangement of parts within the principles of the invention to the full extent indicated by the broad general meaning of the terms in which the appended claims are expressed.

What is claimed is:

1. An ornament assembly for an exhaust pipe of a vehicle comprising:

a sleeve adapted to be secured in an opening end of the exhaust pipe;

an axle retractably received in the sleeve and having a first end exposed from the sleeve and a second end extending into the sleeve;

a spring received in the sleeve and securely attached to the second end of the axle to provide a recoil force to the axle; and a propeller rotatably mounted on the axle at a position exposed from the sleeve, wherein exhaust gases impinge upon the propeller to rotate the propeller radially, and the spring enables axial movement of the axle relative to the exhaust pipe according to the force of the exhaust gases.

2. The ornament assembly as claimed in claim 1 further comprising a stand adapted to be securely attached to the exhaust pipe with a fastener and having a tab for the sleeve being securely attached to the tab.

3. The ornament assembly as claimed in claim 2, wherein the stand has a body with a U-shaped cross section and adapted being mounted around a part of a periphery of the exhaust pipe;

the body has a first end adapted for being exposed from the exhaust pipe and a second end adapted for extending into the exhaust pipe; and the tab extends downward from the second end of the body of the stand and adapted to extend toward a center line of the exhaust pipe.

4. The ornament assembly as claimed in claim 3, wherein the tab has multiple bores defined in the tab;

a bolt extends through one of the bores in the tab and the sleeve to screw with a nut so as to secure the sleeve to the tab with the bolt and the nut.

5. The ornament assembly as claimed in claim 4, wherein the spring has a first end extending outward from the sleeve and hooked on one of the bores in the tab and a second end securely attached to the second end of the axle, whereby the spring is stretched when the axle moves outward from the sleeve.

6. The ornament assembly as claimed in claim 1, wherein the sleeve has an opening defined in one end of the sleeve;

a cap is attached to the end of the sleeve to close the opening in the sleeve; and a central hole is defined in the cap for the axle penetrating through the central hole.

7. The ornament assembly as claimed in claim 6, wherein the spring has a first end abutting the cap and a second end securely attached to the second end of the axle, whereby the spring is compressed when the axle moves outward from the sleeve.

8. The ornament assembly as claimed in claim 7 further comprising a stop attached to the axle to abut the cap so as to limit a travel of the axle relative to the sleeve.

9. The ornament assembly as claimed in claim 1 further comprising a bearing mounted between the axle and the propeller to make the propeller freely rotate relative to the axle.

10. The ornament assembly as claimed in claim 6, wherein the propeller is rotatably mounted on the first end of the axle.

11. The ornament assembly as claimed in claim 1, wherein the sleeve is adapted to be attached to a tail pipe that is attached to the exhaust pipe to enhance the appearance of the vehicle.

12. The ornament assembly for an exhaust pipe of a vehicle of claim 1, wherein the propeller exits and reenters the exhaust pipe as a result of the axial movement.

* * * * *